US012617136B2

(12) United States Patent
Hsu

(10) Patent No.: US 12,617,136 B2
(45) Date of Patent: May 5, 2026

(54) METHOD OF PRODUCING A PLASTIC MEMBER OF A HAIR ORNAMENT

(71) Applicant: Kuo-Yang Hsu, Tainan City (TW)

(72) Inventor: Kuo-Yang Hsu, Tainan City (TW)

( * ) Notice: Subject to any disclaimer, the term of this patent is extended or adjusted under 35 U.S.C. 154(b) by 91 days.

(21) Appl. No.: 18/786,833

(22) Filed: Jul. 29, 2024

(65) Prior Publication Data

US 2025/0083366 A1      Mar. 13, 2025

(30) Foreign Application Priority Data

Sep. 13, 2023    (TW) ................................. 112134903

(51) Int. Cl.
| | |
|---|---|
| *B29C 45/16* | (2006.01) |
| *B29B 7/22* | (2006.01) |
| *B29B 9/02* | (2006.01) |
| *B29B 13/02* | (2006.01) |
| *B29C 45/00* | (2006.01) |
| *A45D 8/20* | (2006.01) |
| *A45D 8/36* | (2006.01) |
| *B29K 25/00* | (2006.01) |
| *B29K 69/00* | (2006.01) |
| *B29K 105/00* | (2006.01) |

(52) U.S. Cl.
CPC .............. *B29C 45/164* (2013.01); *B29B 7/22* (2013.01); *B29B 9/02* (2013.01); *B29B 13/02* (2013.01); *B29C 45/0001* (2013.01); *A45D 8/20* (2013.01); *A45D 8/36* (2013.01); *B29C 2045/1698* (2013.01); *B29K 2025/06* (2013.01); *B29K 2069/00* (2013.01); *B29K 2105/0032* (2013.01); *B29K 2105/0088* (2013.01); *B29K 2995/0026* (2013.01); *B29K 2995/0029* (2013.01)

(58) Field of Classification Search
CPC . A45D 8/36; A45D 8/14; A45D 8/004; A45D 8/00; B29C 45/0015; B29C 45/0013; B29C 45/0001; B29C 45/00; B29C 45/46; B29C 45/1816; B29C 45/164; B29C 45/16; B29B 13/02; B29B 13/00; B29B 9/02; B29B 2009/163; B29B 7/244
See application file for complete search history.

(56) References Cited

U.S. PATENT DOCUMENTS

2020/0359762 A1* 11/2020 Chang ...................... A45D 8/20
2021/0244152 A1* 8/2021 Hsu ...................... C08G 63/183

FOREIGN PATENT DOCUMENTS

TW          202135699 A  * 10/2021

* cited by examiner

*Primary Examiner* — Cedrick S Williams
(74) *Attorney, Agent, or Firm* — Best & Flanagan LLP

(57) ABSTRACT

A method of producing a plastic member of a hair ornament comprises providing first and second plastic materials which are different in material and color. The first plastic material is transparent or translucent. The second plastic material is in the form of a plurality of particles. The first plastic material, the second plastic material, and a bridging agent are mixed and filled into an injection molding machine. The first plastic material melts and envelops the particle-shaped second plastic material. The enveloped particle-shaped second plastic material is outputted to a mold for forming the plastic member of the hair ornament. A hardened product of the plastic member is removed from the mold. The first plastic material forms an outer surface layer of the plastic member. The shape and the color of the second plastic material are directly viewable from an outer side of the product of the plastic member.

5 Claims, 3 Drawing Sheets

A–A

METHOD OF PRODUCING A PLASTIC MEMBER OF A HAIR ORNAMENT

BACKGROUND OF THE INVENTION

The present invention relates to a method of producing a plastic member of a hair ornament and, more particularly, to a method for forming a hair ornament with improved color quality.

Hair ornaments, such as hair clips, hair bands, hair ties, etc. are worn on the hair and often have bright colors to enhance the decoration quality. In current approaches for enhancing the sense of beauty in color, a colored layer is applied on a surface of a hair ornament by coating or spray painting, but the colored layer tends to wear and, thus, fall from the surface of the hair ornament.

To improve the above situation, plastic materials of two different colors are respectively filled into an injection molding machine for formation. Specifically, a plastic material of a color melts first and is outputted by the injection molding machine to a mold for hardening/formation of a semi-product. Another plastic material of another color is filled into the injection molding machine and is outputted in a molten state into another mold to envelop a portion of the outer surface of the hardened semi-product. Thus, the hair ornament after formation has two distinct colors in appearance. However, the above formation approach is monotonous in color.

Currently, two or more plastic materials of different colors may be mixed and filled into an injection molding machine at the same time. The different plastic materials are mixed after melting and are then outputted to a mold for formation. Thus, the hair ornament product may provide different patterns and colors by mixed colors or gradient layers, thereby providing diversity in the sense of quality. However, this formation approach fails to provide distinct colors, and two different materials cannot be polymerized completely, such that the crystallization is incomplete, and the surface layer of the product is apt to peel.

BRIEF SUMMARY OF THE INVENTION

An objective of the present invention is to provide a method of producing a hair ornament with distinct colors and enhanced diversity.

A method of producing a plastic member of a hair ornament according to the present invention comprises:

providing a first plastic material which is transparent or translucent;

providing a second plastic material which is in a form of a plurality of particles, is made of a material different from the first plastic material, and has a color different from a color of the first plastic material;

mixing the first plastic material, the second plastic material, and a bridging agent to form a mixture, and filling the mixture into an injection molding machine;

heating and melting the first plastic material to envelop the particle-shaped second plastic material, and outputting the enveloped particle-shaped second plastic material to a mold for forming the plastic member of the hair ornament; and removing a hardened product of the plastic member from the mold, wherein the first plastic material forms an outer surface layer of the product of the plastic member, wherein a shape and the color of the second plastic material are directly viewable from an outer side of the product of the plastic member.

In an example, a colorant and the hardening agent are added into the second plastic material while enhancing bonding stability between the colorant and the second plastic material.

In an example, providing the second plastic material includes filling the second plastic material in a molten state into a block mold for forming a block; placing a liquid colorant and the hardening agent into the block mold; placing the block mold in hot water of about 98-100° C. to gradually mix and harden the colorant, the hardening agent, and the second plastic material; placing the block mold in an oven to remove residual water in the second plastic material; removing the block-shaped second plastic material from the block mold; and chopping the block-shaped second plastic material into the plurality of particles.

The second plastic material includes a hardening agent to avoid deformation of the particle-shaped second plastic material under the forming pressure. The second plastic material does not melt in an environment in which the first plastic material melts at its melting point. The bridging agent provides complete enveloping and connection between the first plastic material and the second plastic material, reliably preventing peeling of the color of the second plastic material.

The first plastic material is transparent and is not polymerized with the second plastic material to avoid mixing of colors. Thus, the shape and color of the second plastic material can be clearly seen through the transparent first plastic material. The color and the internal three-dimensional visual effect of the plastic member can be varied according to different viewing angles. Furthermore, the first plastic material is polymerized completely to avoid peeling from the surface, thereby enhancing the quality and reliably of the product of the plastic member of the hair ornament.

The present invention will become clearer in light of the following detailed description of illustrative embodiments of this invention described in connection with the drawings.

DETAILED DESCRIPTION OF THE INVENTION

Figure 1:
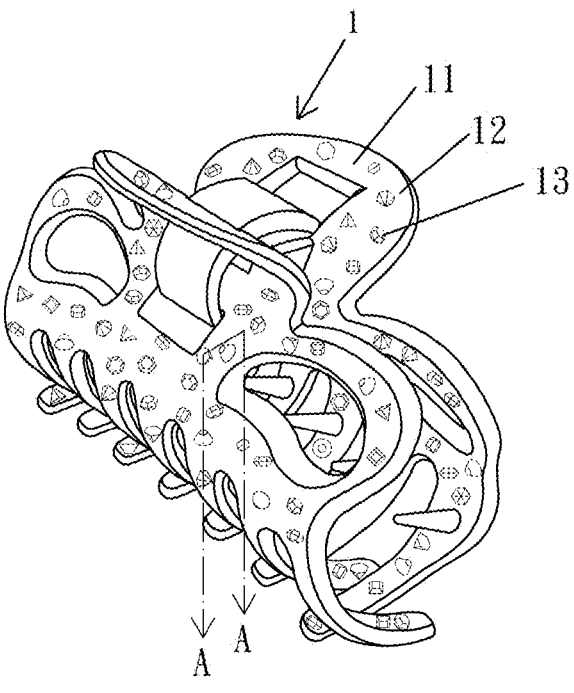
FIG. 1 is a diagrammatic perspective view of a hair ornament of a first example formed by a method according to the present invention.
Figure 2:
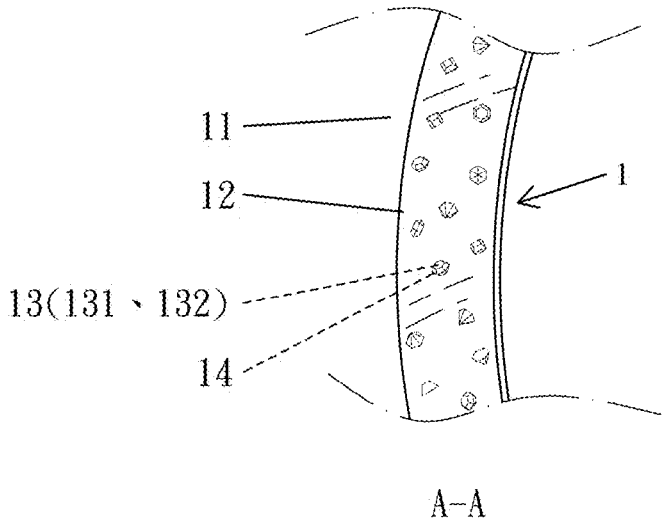
FIG. 2 is a cross sectional view taken along section line A-A of FIG. 2.

Please refer to FIGS. 1 and 2 illustrating a hair ornament 1 of a first example formed by a method according to the present invention. The hair ornament 1 of the first example is in the form of a hair clip. The method according to the present invention is generally used to produce a plastic member 11 of the hair ornament 1.

The method of producing a plastic member 11 of a hair ornament 1 according to the present invention comprises:

providing a first plastic material 12 which is transparent or translucent (step S1);

providing a second plastic material 13 which is in the form of a plurality of particles, is made of a material different from the first plastic material 12, and has a color different from a color of the first plastic material 12 (step S2);

mixing the first plastic material 12, the second plastic material 13, and a bridging agent 14 to form a mixture, and filling the mixture into an injection molding machine (not shown) (step S3);

heating and melting the first plastic material 12 to envelop the particle-shaped second plastic material 13, and outputting the enveloped particle-shaped second plastic material 13 to a mold (not shown) for forming the plastic member 11 of the hair ornament (step S4); and removing a hardened product of the plastic member 11 from the mold (step S5), wherein the first plastic material 12 forms an outer surface layer of the product of the plastic member 11, wherein a shape and the color of the second plastic material 13 are directly viewable from an outer side of the product of the plastic member 11.

In step S1 of the method according to the present invention, the first plastic material 12 may be polystyrene (PS), which is a transparent material and has a melting point of about 150-180° C. In step S2 of the method according to the present invention, the second plastic material 13 may be polycarbonate (PC) having a melting point of about 220-230° C.

In the step of providing the second plastic material 13, the second plastic material 13 in a molten state may be filled into a block mold (not shown) for forming a block. At the same time, a liquid colorant 131 and a hardening agent 132 are filled into the block mold. Then, the block mold is placed in hot water of about 98-100° C. for about 7-9 hours to gradually mix and harden the colorant 131, the hardening agent 132, and the second plastic material 13. Next, the block mold is placed in an oven (not shown) and baked for 4-5 hours to remove residual water in the second plastic material 13. Then, the block-shaped second plastic material 13 is removed from the block mold and chopped into a plurality of particles.

In step S4 of the method according to the present invention, the injection molding machine heats to a temperature to melt the first plastic material 12. As an example, the temperature may be 180° C., which is sufficient to melt polystyrene (PS) but insufficient to melt the second plastic material 13. Thus, the second plastic material 12 in the molten state may envelop the second plastic material 13. Furthermore, the second plastic material 13 includes the hardening agent 132 to avoid deformation of the particle-shaped second plastic material 13 under the forming pressure. Furthermore, the second plastic material 13 does not melt in an environment in which the first plastic material melts at its melting point. Furthermore, the bridging agent 14 provides complete enveloping and connection between the first plastic material 12 and the second plastic material 13. This avoids peeling of the first plastic material 12 from the surface of the second plastic material 13 due to incomplete bonding. Furthermore, the first plastic material 12 forming the outer surface layer of the plastic member 11 may be polymerized completely after melting.

In step S5 of the method according to the present invention, the second plastic material 13 is filled into the mold for forming a plastic member 11 of a hair ornament 1 after the second plastic material 13 is enveloped by the first plastic material 12. After cooling and hardening, the first plastic material 12 forms the outer surface layer of the product of the plastic member 11. Furthermore, the first plastic material 12 envelops the second plastic material 13 which does not melt and deform, such that the first plastic material 12 is not polymerized with the second plastic material 13 to avoid mixing of colors while providing enhanced transparency.

Thus, when viewing the product of the plastic member 11, the shape and color of the second plastic material 13 can be clearly seen through the transparent first plastic material 12. Furthermore, the reflected color and the internal three-dimensional visual effect of the first plastic material 12 can be varied according to the different incident angles of the light rays irradiating the product of the plastic member 11. In comparison with conventional hair ornaments, the hair ornament 1 produced by the method according to the present invention provides a transparent visual effect and a sense of beauty in terms of the change of the color in the interior of the hair ornament 1. Furthermore, the first plastic material 12 may be polymerized completely to avoid peeling from the outer surface of the plastic member 11, which enhances the quality and reliably of the product of the plastic member 11 of the hair ornament 1 while preventing the second plastic material 13 on the inner side of the plastic member 11 from wear.

Figure 3:
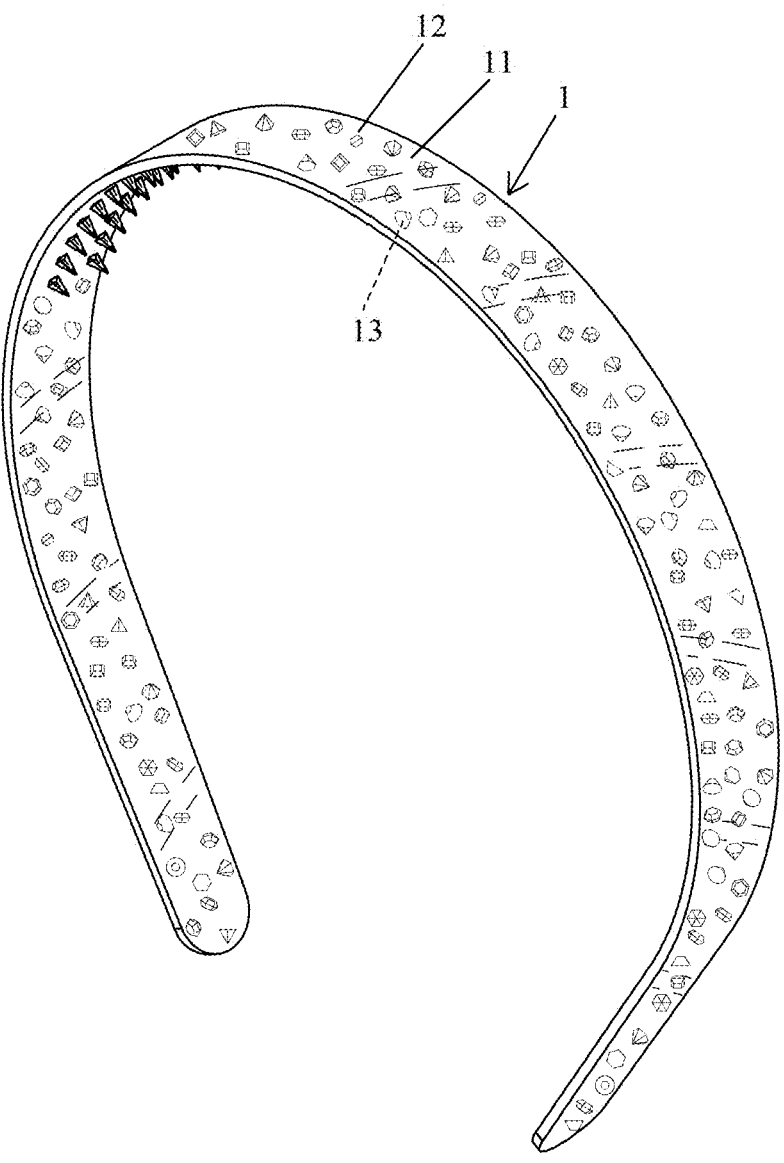
FIG. 3 is a diagrammatic perspective view of a hair ornament of a second example formed by the method according to the present invention.

The hair ornament 1 produced by the method according to the present invention may have different shapes. For example, FIG. 3 shows a hair ornament 11 of a second example formed by the method according to the present invention. The second example is substantially the same as the first example except for that the hair ornament 11 of the second example is in the form of a hair band. It can be appreciated that the method according to the present invention may be used to produce hair ties or other hair ornaments.

The method according to the present invention may also provide other plastic materials which are different from the first and second plastic materials 12 and 13, which have colors different from the first and second plastic materials 12 and 13, and which have melting points higher than that of the first plastic material 12. The first and second plastic material 12 and 13 and the other plastic materials may be formed to provide the product of the plastic member 11 with diversity and sense of beauty in colors and appearance.

In view of the foregoing, the method according to the present invention may provide the hair ornament 1 with more change in colors and enhanced sense of quality.

The foregoing embodiments are examples of the present invention, not limitation to the present invention. All equivalent changes made in accordance with the spirit of the present invention should also fall within the scope of the present invention.

The invention claimed is:

1. A method of producing a plastic member of a hair ornament, with the method comprising:

providing a first plastic material which is transparent or translucent;

providing a second plastic material which is in a form of a plurality of particles, is made of a material different from the first plastic material, and has a color different from a color of the first plastic material;

mixing the first plastic material, the second plastic material, and a bridging agent to form a mixture, and filling the mixture into an injection molding machine;

heating and melting the first plastic material to envelop the particle-shaped second plastic material, and outputting the enveloped particle-shaped second plastic material to a mold for forming the plastic member of the hair ornament; and removing a hardened product of the plastic member from the mold, wherein the first plastic material forms an outer surface layer of the product of the plastic member, wherein a shape and the color of the second plastic material are directly viewable from an outer side of the product of the plastic member, wherein the second plastic material includes a hardening agent to avoid deformation of the particle-shaped second plastic material under a forming pressure, wherein the second plastic material does not melt in an environment in which the first plastic material melts at its melting point, and wherein the bridging agent provides complete enveloping and connection between the first plastic material and the second plastic material, and wherein providing the second plastic material includes: filling the second plastic material in a molten state into a block mold for forming a block, placing a liquid colorant and the hardening agent into the block mold, placing the block mold in hot water of about 98-100° C. to gradually mix and harden the colorant, the hardening agent, and the second plastic material, placing the block mold in an oven to remove residual water in the second plastic material removing the block-shaped second plastic material from the block mold, and chopping the block shaped second plastic material into the plurality of particles.

2. The method as claimed in claim 1, wherein a colorant and the hardening agent are added into the second plastic material while enhancing bonding stability between the colorant and the second plastic material.

3. The method as claimed in claim 1, wherein the block mold is placed in the hot water for 7-9 hours.

4. The method as claimed in claim 1, wherein the block mold is baked for 4-5 hours.

5. The method as claimed in claim 1, wherein the first plastic material is polystyrene, and wherein the second plastic material is polycarbonate.

* * * * *